United States Patent [19]

Nukiyama

[11] Patent Number: 4,999,804

[45] Date of Patent: Mar. 12, 1991

[54] FULL ADDER WITH SHORT SIGNAL PROPAGATION PATH

[75] Inventor: Tomoji Nukiyama, Tokyo, Japan

[73] Assignee: NEC Corporation, Tokyo, Japan

[21] Appl. No.: 319,789

[22] Filed: Mar. 7, 1989

[30] Foreign Application Priority Data

Mar. 8, 1988 [JP] Japan .................................. 63-55441

[51] Int. Cl.⁵ .............................................. G06F 7/50
[52] U.S. Cl. .................................................. 364/784
[58] Field of Search .......................... 364/784, 786-788

[56] References Cited

U.S. PATENT DOCUMENTS

| | | | |
|---|---|---|---|
| 3,878,986 | 4/1975 | Hirasawa | 364/784 |
| 4,583,192 | 4/1986 | Cieslak | 364/784 |
| 4,601,007 | 7/1986 | Uya et al. | 364/784 |
| 4,651,296 | 3/1987 | Koike | 364/786 |

*Primary Examiner*—Dale M. Shaw
*Assistant Examiner*—Long T. Nguyen
*Attorney, Agent, or Firm*—Sughrue, Mion, Zinn, Macpeak & Seas

[57] ABSTRACT

A full adder has a carry producing circuit responsive to at least two input bits and a low order carry bit and producing a carry bit, and a sum producing circuit responsive to the two input bits, the low order carry bit and the carry bit and producing a sum bit, wherein the sum producing circuit is provided with a first sum producing portion activated in the co-presence of the two input bits of logic "1" level or logic "0" level and the low order carry bit of logic "1" level or logic "0" level to produce the sum bit, and a second sum producing portion activated in the co-presence of at least one of the input bits and the low order carry bit different in logic level from the other bits to produce the sum bit opposite in logic level to the carry bit, so that signal propagation path is reduced in length, thereby achieving a high speed operation.

2 Claims, 5 Drawing Sheets

FIG.1
PRIOR-ART

FIG. 2
PRIOR-ART

FULL ADDER WITH SHORT SIGNAL PROPAGATION PATH

FIELD OF THE INVENTION

This invention relates to an arithmetic unit and, more particularly, to a full adder appropriate for CMOS implementation.

BACKGROUND OF THE INVENTION

Figure 1:
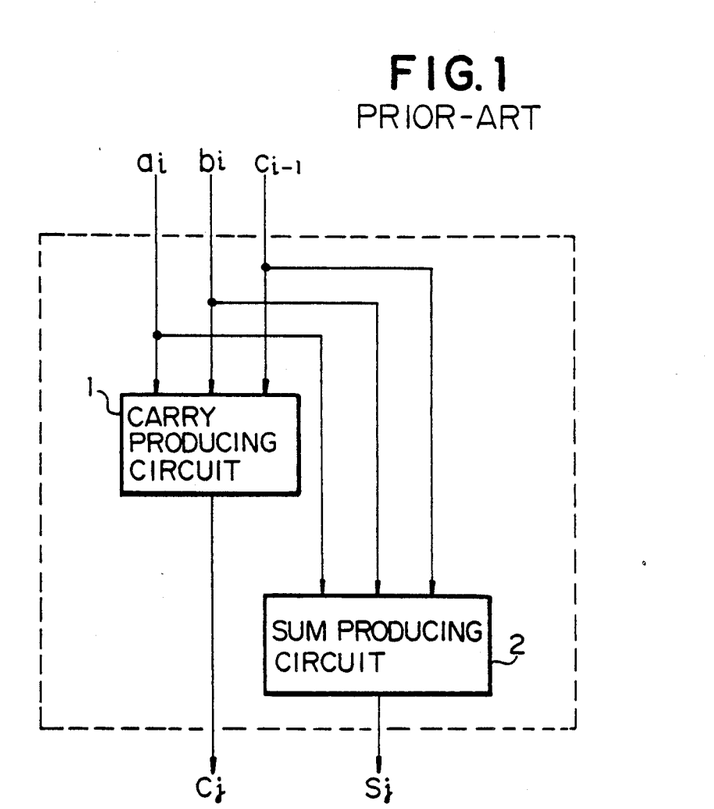
FIG. 1 is a block diagram showing the circuit arrangement of a prior-art full adder.

A typical example of the full adder is shown in FIG. 1 and basically implemented by a combination of a carry-producing circuit 1 and a sum-producing circuit 2. Though not shown in FIG. 1, a plurality of the full adders are arranged in cascade to form an arithmetic unit, and each full adder produces a partial sum bit Sj and a carry bit Cj. Assuming now that two multiple-bit input signals A and B respectively representative of an addend and an augend are supplied to the arithmetic unit, the multiple-bit input signals A and B are respectively subdivided into a plurality of segments or bits a1, a2, . . . , ai, and aj and b1, b2, . . . , bi and bj, and each of the bits a1, a2, . . . , ai and aj is paired with each of the bits b1, b2, . . . , bi and bj to form a bit combination. Each bit combination such as ai and bi are supplied to each of the full adder together with the carry bit produced by the full adder provided for the lower order position. For example, the full adder shown in FIG. 1 is supplied with the segments ai and bi and the carry bit ci-1. The bits ai and bi and the carry bit ci-1 are supplied in parallel to the carry producing circuit 1 and the sum producing circuit 2 which produce the partial sum bit sj and the carry bit cj, respectively.

Figure 2:
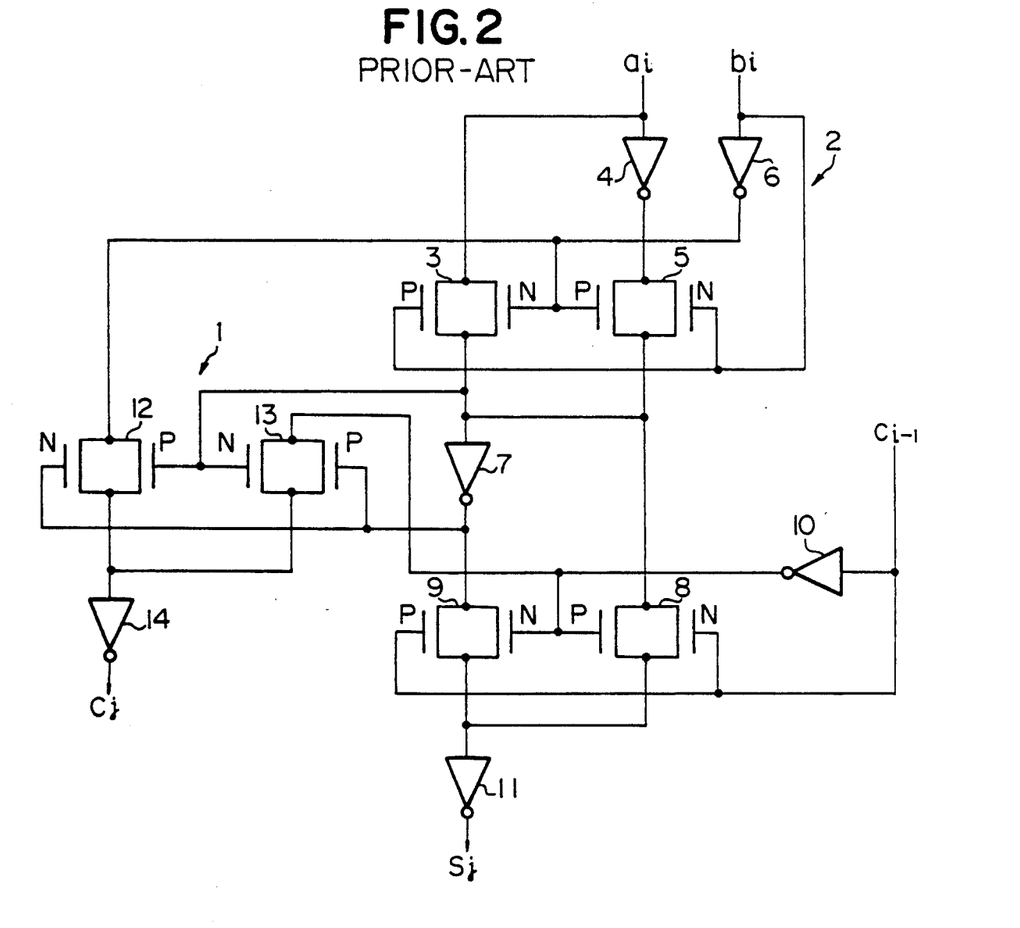
FIG. 2 is a circuit diagram showing the arrangement of the prior-art full adder.

Turning to FIG. 2 of the drawings, the full adder shown in FIG. 1 is implemented by inverter circuits and transfer gates. The bit ai is directly supplied to a transfer gate 3 and is supplied in parallel to an inverter circuit 4 which in turn supplies a transfer gate 5 with the complementary bit of the input bit ai. The transfer gates 3 and 5 are gated by the bit bi and the complementary bit of the input bit bi fed from an inverter circuit 6, and relay or block the input bit ai and the complementary bit thereof to an inverter circuit 7 and a transfer gate 8 depending upon the level of the input bit bi. The inverter circuit 7 produces the complementary bit of the input bit ai which is supplied to a transfer gate 9. Both of the transfer gates 8 and 9 are gated by the carry bit ci-1 and the complementary bit thereof fed from an inverter circuit , so that the transfer gates 8 and 9 relay or block the complementary bit of the input bit ai depending upon the level of the carry bit ci-1. The complementary bit of the input bit ai is supplied to an inverter circuit 11, and the sum bit sj is produced by the inverter circuit 11.

The complementary bit of the input bit bi is further supplied to a transfer gate 12 which is gated by the input bit ai and the complementary bit thereof. The complementary bit of the carry bit ci-1 is supplied to a transfer gate 13 which is also gated by the input bit ai and the complementary bit thereof. Thus, the transfer gates 12 and 13 are concurrently gated by the input bit ai and the complementary bit thereof to relay or block the complementary bits fed from the inverter circuits 6 and 10, respectively, depending upon the level of the input bit ai. An inverter circuit 14 is shared by the transfer gates 12 and 13 and produces a carry bit cj.

Table 1 is the truth table for the full adder illustrated in FIG. 2.

TABLE 1

| ai | bi | ci-1 | sj | cj |
|----|----|------|----|----|
| 0  | 0  | 0    | 0  | 0  |
|    |    | 1    | 1  | 0  |
| 0  | 1  | 0    | 1  | 0  |
|    |    | 1    | 0  | 1  |
| 1  | 0  | 0    | 1  | 0  |
|    |    | 1    | 0  | 1  |
| 1  | 1  | 0    | 0  | 1  |
|    |    | 1    | 1  | 1  |

Various circuit arrangements have been proposed for the carry producing circuit as well as the sum producing circuit, aiming at, for example, achieving a quick signal propagation, a fast switching function and a large current driving capability. Moreover, development efforts are made for reduction of component elements, thereby aiming at increasing in integration density.

In a full adder of the carry propagation type (which is abbreviated as "CPA"), the processing speed is mainly dominated by the carry propagation speed, and, for this reason, the development efforts tend to be focused upon the carry propagation circuit. On the other hand, since ripple functions must be achieved in a carry saving adder (which is abbreviated as "CSA") and each full adder forming part of the Wallace Tree of a parallel multiplier, it is necessary to achieve a high speed operation with static circuits formed by a relatively small number of circuit components.

However, these full adders hardly satisfy the above mentioned technical subjects such as, for example, the reduction in signal propagation path and improvement in capacitance driving capability, and, especially, no CMOS (Complementary MOS inverter) implementation is available in a practical high speed arithmetic unit.

SUMMARY OF THE INVENTION

It is therefore an important object of the present invention to provide a full adder which has relatively short signal propagation paths.

It is another important object of the present invention to provide a full adder capable of driving a large capacitance.

It is still another important object of the present invention to provide a full adder implemented by CMOS inverter circuits each capable of driving a large capacitance.

To accomplish these objects, the present invention proposes to produce the sum bit opposite in logic level to the carry bit with the exception where the addend, the augend and the carry supplied thereto are identical in logic level with one another.

In accordance with the present invention, there is provided a full adder comprising (a) a carry producing circuit responsive to at least two input bits and a low order carry bit and producing a carry bit, and (b) a sum producing circuit responsive to the two input bits, the low order carry bit and the carry bit and producing a sum bit, wherein the sum producing circuit comprises a first sum producing portion activated in the co-presence of the two input bits of either first or second logic level and the low order carry bit of either first or second logic level to produce the sum bit, and a second sum producing portion activated in the co-presence of at least one of the input bits and the low order carry bit different in logic level from the other bits to produce the sum bit opposite in logic level to the carry bit.

BRIEF DESCRIPTION OF THE DRAWINGS

The features and advantages of a full adder according to the present invention will be more clearly understood from the following description taken in conjunction with the accompanying drawings in which.

DESCRIPTION OF THE PREFERRED EMBODIMENT

Figure 3:
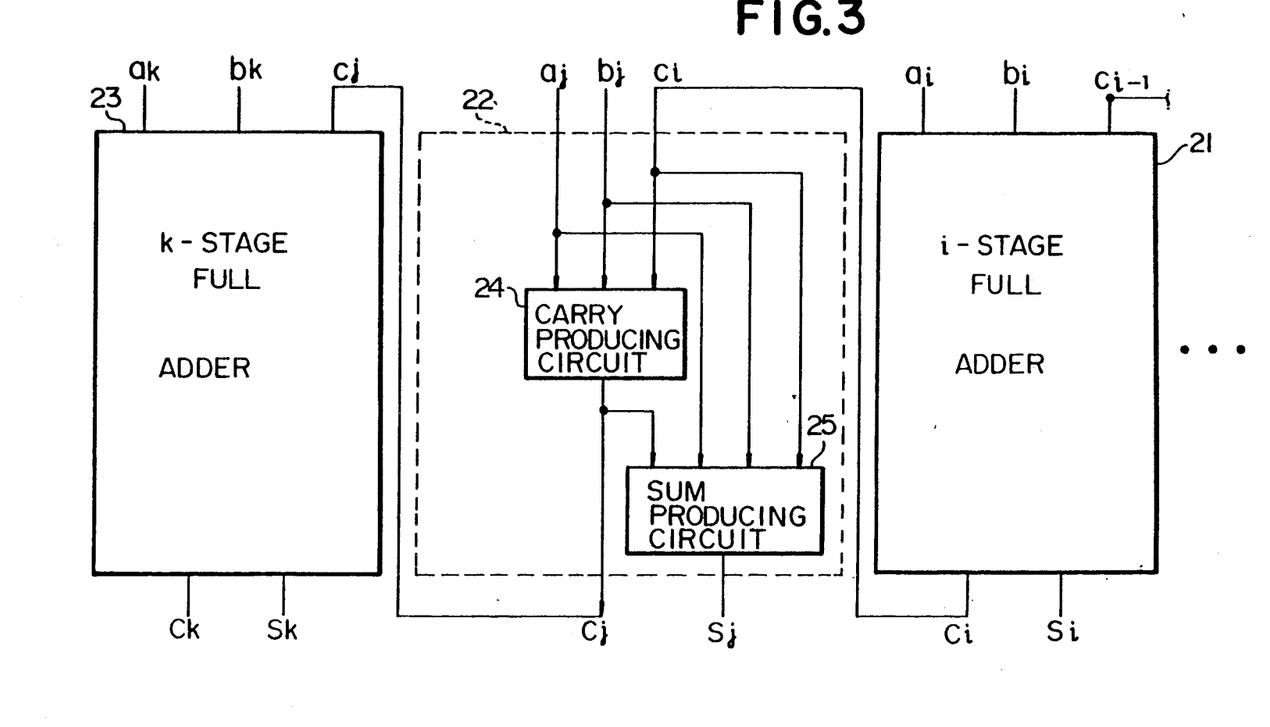
FIG. 3 is a block diagram showing the circuit arrangement of an arithmetic unit implemented by full adders each embodying the present invention.

Referring first to FIG. 3 of the drawings, an arithmetic unit is implemented by a plurality of full adders, however, only i, j and k stages 21, 22 and 23 are shown therein. Multiple-bit input signals A and B respectively representative of an addend and an augend are supplied to the arithmetic unit and respectively subdivided into a plurality of input bits $a_1, \ldots, a_i, a_j$ and $a_k$ and input bits $b_1, \ldots, b_i, b_j$ and $b_k$. The input bits $a_x$ and $b_x$ (where x is $1, \ldots, i, j$ and k) are supplied to each of the full adder together with a carry bit produced by the full adder located at the lower order position. All of the full adders are identical in circuit arrangement with one another, so that description is made for the j-stage full adder 22 only.

The j-stage full adder 22 largely comprises a carry producing circuit 24 supplied with the input bits $a_j$ and $b_j$ and with the carry bit $c_i$ and a sum producing circuit 25 to which not only the input bits $a_j$ and $b_j$, the carry bit $c_i$ but also the carry bit $c_j$ are supplied for producing the sum bit $s_j$ opposite in logic level to the carry bit $c_j$ in so far as at least one of the input bits $a_j$ and $b_j$ and the carry bit $c_i$ is different in logic level from the other bits. That is, when all of the input bits $a_j$ and $b_j$ and the carry bit $c_i$ are logic "1" level or logic "0" level, the sum bit $s_j$ and the carry bit $c_j$ are logic "1" level or logic "0" level, however, if one of the input bits $a_j$ and $b_j$ and the carry bit $c_i$ is different in logic level from the other bits, the sum bit $s_j$ is decided to have a logic level opposite to that of the carry bit $c_j$. This relationship is indicated in Table 2.

TABLE 2

| $a_j$ | $b_j$ | $c_i$ | $s_j$ | $c_j$ |
| --- | --- | --- | --- | --- |
| 0 | 0 | 0 | 0 | 0 |
|  |  | 1 | $\overline{c_j}$ | 0 |
| 0 | 1 | 0 | $\overline{c_j}$ | 0 |
|  |  | 1 | $\overline{c_j}$ | 1 |
| 1 | 0 | 0 | $\overline{c_j}$ | 0 |
|  |  | 1 | $\overline{c_j}$ | 1 |
| 1 | 1 | 0 | $c_j$ | 1 |
|  |  | 1 | 1 | 1 |

For achieving the above relationship, the sum producing circuit 25 has inverter circuits 26 and 27 the former of which is supplied with the carry bit $c_j$ and the later of which produced the sum bit $s_j$. To the inverter circuit 27 are coupled a p-channel type field effect transistor 28 and an n-channel type field effect transistor 29 which in turns are coupled in parallel to three p-channel type field effect transistors 30, 31 and 32 and three n-channel type field effect transistors 33, 34 and 35, respectively. The inverter circuit 27 is further coupled in parallel to a series of p-channel type field effect transistors 36, 37 and 38 and a series of n-channel type field effect transistors 39, 40 and 41. The p-channel type field effect transistors 30, 31, 32 and 38 are coupled to a source of positive voltage level $V_{dd}$, but the n-channel type field effect transistors 33, 34, 35 and 41 are coupled to the ground.

The p-channel type field effect transistor 28 and the n-channel type field effect transistor 29 are complementarily gated by the inverter circuit 26, and the n-channel type field effect transistors 30 and 36 and the n-channel type field effect transistors 33 and 39 are complementarily shifted between on-states and off-states by the input bit $a_j$. The input bit $b_j$ is supplied to the gate electrodes of the p-channel type field effect transistors 31 and 37 as well as the gate electrodes of the n-channel type field effect transistors 34 and 40, so that the p-channel type field effect transistors 31 and 37 and the n-channel type field effect transistors 34 and 40 complementarily turn on or off depending upon the voltage level of the input bit $b_j$. The p-channel type field effect transistors 32 and 38 and the n-channel type field effect transistors 35 and 41 are responsive to the carry bit $c_i$ and shifted between on-states and off-states in the complementary manner.

Description is hereinunder made for the circuit behavior of the sum producing circuit 25 on the assumption that logic "1" level and logic "0" level correspond to a high voltage level and a low voltage level, respectively. If all of the input bits $a_j$ and $b_j$ and the carry bit $c_i$ are logic "1" level, the n-channel type field effect transistors 39, 40 and 41 simultaneously turn on to provide a conduction path 42 from the ground to the inverter circuit 27, so that the inverter circuit 27 produces the sum bit of logic "1" level regardless of the carry bit $c_j$. On the other hand, all of the input bits $a_j$ and $b_j$ and the carry bit $c_i$ are logic "0" level, the p-channel type field effect transistors 36, 37 and 38 turn on to provide a conduction path 43 from the source of positive voltage level $V_{dd}$ to the inverter circuit 27. The conduction path 43 is thus established from the source of positive voltage level $V_{dd}$, the inverter circuit 27 produces the sum $s_j$ of logic "0" level regardless of the carry bit $c_j$.

If one of the input bits $a_j$ and $b_j$ and the carry bit $c_i$ is logic "1" level, one of the n-channel type field effect transistors 33, 34 and 35 turns on, so that whether or not a conduction path 44 is established depends on the carry bit $c_j$. Namely, when the carry bit $c_j$ is logic "1" level, the inverter circuit 26 provides logic "0" level to the p-channel type field effect transistor 28 as well as the n-channel type field effect transistor 29, so that the p-channel type field effect transistor 28 turns on, but the n-channel type field effect transistor 29 remains off. Then, no conduction path is established from the inverter circuit 27 through the p-channel type field effect transistor 29 to the ground. However, the other input bit or the carry bit $c_i$ is logic "0", so that one of the p-channel type field effect transistors 30, 31 and 32 turns on to provide a conduction path 45 from the source of positive voltage level $V_{dd}$ through the p-channel type 28 to the inverter circuit 27. With the logic "1" level, the inverter circuit 27 produces the sum bit $s_j$ of logic "0" level which is opposite to the carry bit $c_j$. On the other hand, if the carry bit cj is logic "0 level, the inverter circuit 26 provides logic "1" level to the p-channel type field effect transistor 28 and the n-channel type field effect transistor 29. With logic "1" level, the n-channel type field effect transistor 29 turns on, but the p-channel type field effect transistor 28 remains off, thereby establishing the conduction path 44 and blocking the conduction path 45. This results in that the inverter circuit 27 produces logic "1" level which is opposite to the carry bit Cj.

As will be understood from the foregoing description, the sum producing circuit 25 produces the sum bit sj through two switching operations, i. e., one of the field effect transistors 28 and 29 and one of the field effect transistors 30 to 35. On the contrary, the prior-art sum producing circuit 2 illustrated in FIG. 2 needs five switching operations, so that the sum producing circuit according to the present invention is advantageous over the prior-art in short signal propagation path. Moreover, the sum producing circuit 25 is reduced in the number of the component transistors and achieves a static and complementary function The complementary function is of the ratioless. Moreover, all of the component transistors forming parts of the sum producing circuit 25 are used as either pull-up or pull-down element, so that a large capacitance driving capability is achieved.

Figure 4:
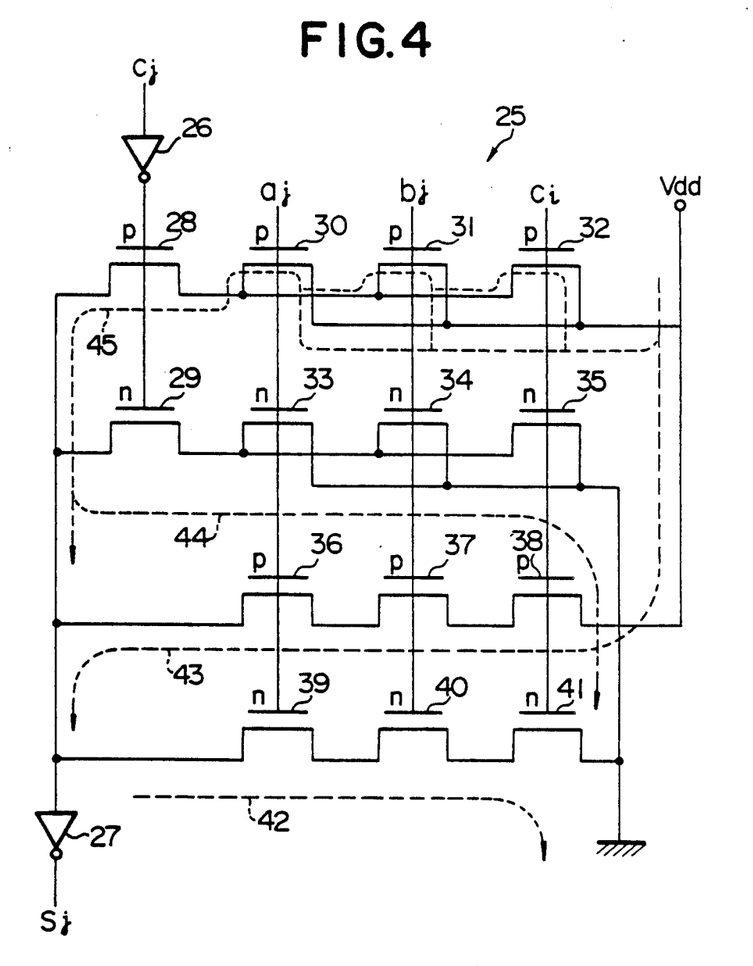
FIG. 4 is a circuit diagram showing the arrangement of the sum producing circuit incorporated in the full adder shown in FIG. 3 in detail.
Figure 5:
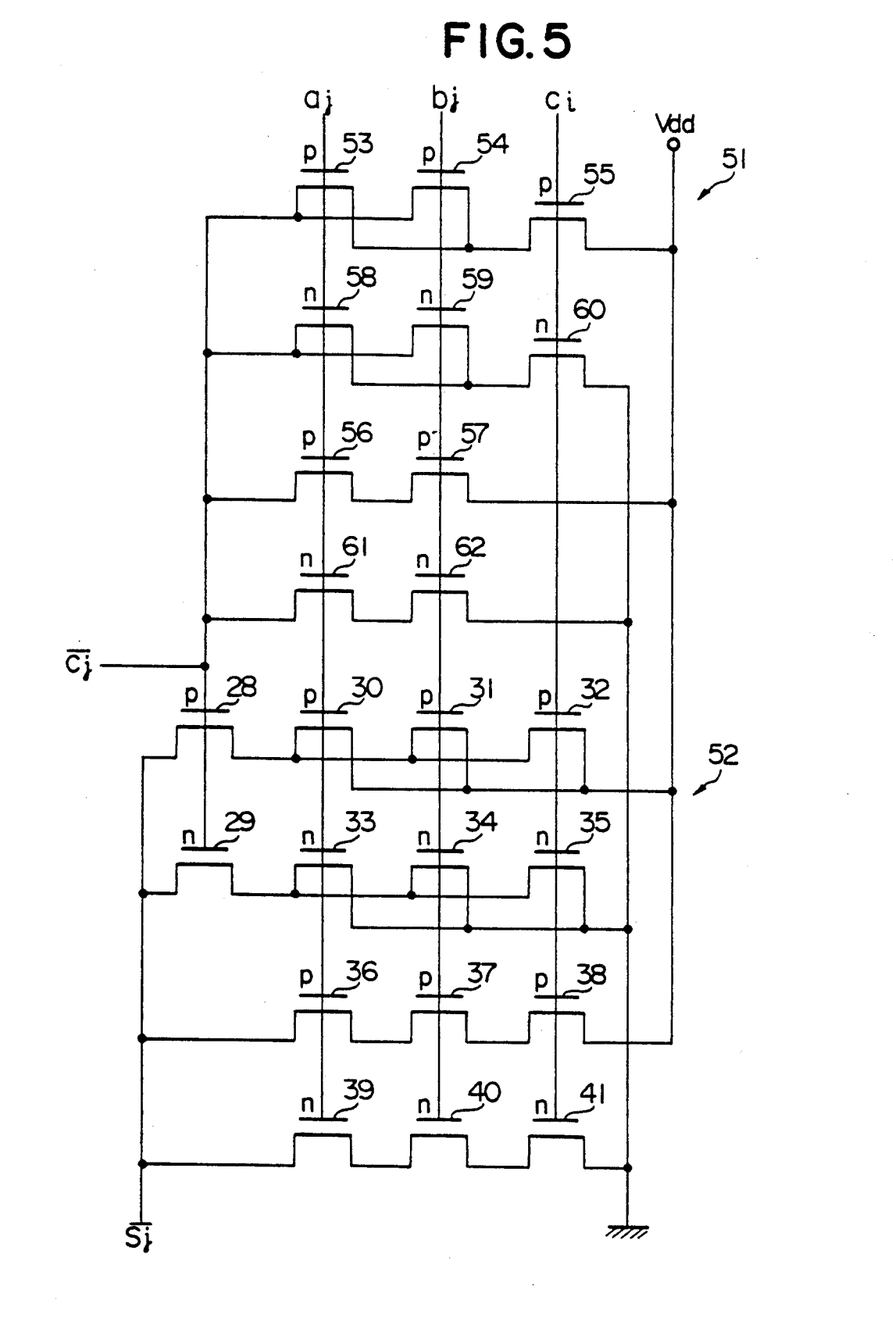
FIG. 5 is a circuit diagram showing the arrangement of another full adder embodying the present invention.

Turning to FIG. 4 of the drawings, another full adder is implemented by using CMOS inverters. The full adder largely comprises a carry producing circuit 51 and a sum producing circuit 52, and the sum producing circuit 52 is similar in transistor arrangement to the sum producing circuit 25, so that corresponding component transistors are designated by like reference numerals designating the counter parts of the sum producing circuit 25.

The carry producing circuit 51 has five p-channel type field effect transistors 53, 54, 55, 56 and 57 and five n-channel type field effect transistors 58, 59, 60, 61 and 62. Then, not only the sum producing circuit 52 but also the carry producing circuit 51 are implemented by the CMOS inver&ers. When all of the input bits aj and bj and the carry bit ci are logic "1" or logic "0", the n-channel type field effect transistors 61 and 62 or the p-channel type field effect transistors 56 and 57 turn on to provide a conduction path from the ground or the source of positive voltage level Vdd, so that the complementary bit of the carry bit cj is produced in logic "0" level or logic "1" level On the other hand, one of the input tits aj and bj is logic "1" level, the complementary bit of the carry bit cj depends on the carry bit ci. Namely, with the input bit of logic "1" level (which means that the other input bit is logic "0" level, either n-channel type field effect transistor 58 or 59 and either p-channel type field effect transistor 53 or 54 turn on. In this situation, if the carry bit ci is logic "1" level, the n-channel type field effect transistor 60 turns on to provide a conduction path from the ground, so that the complementary bit of the carry bit cj is determined to be logic "0". On the other hand, when the carry bit cj is logic "0" level, the p-channel type field effect transistor 55 turns on to provide a conduction path from the source of positive voltage level Vdd. Then, the complementary bit of the carry bit cj is decided to be logic "1".

Although particular embodiments of the present invention have been shown and described, it will be obvious to those skilled in the art that various changes and modifications may be made without departing from the spirit and scope of the present invention.

What is claimed is:

1. A full adder having first and second input nodes, a low order carry node, and carry node and a sum node, comprising:
 (a) a carry producing circuit responsive to at least first and second input bits at said first and second input nodes and a low order carry bit at said low order carry node and producing a carry bit at said carry node; and
 (b) a sum producing circuit responsive to said two input bits, said low order carry bit and said carry bit and producing a sum bit at said sum node, in which said sum producing circuit comprises first, second and third field effect transistors of a first channel conductivity type coupled in parallel between a first voltage terminal and a first intermediate node, a fourth field effect transistor of the first channel conductivity type coupled between the first intermediate node and said sum node, fifth, sixth and seventh field effect transistors of a second channel conductivity type coupled in parallel between a second voltage terminal and a second intermediate node, an eighth field effect transistor of the second channel conductivity type coupled between the second intermediate node and the sum node, ninth, tenth, and eleventh field effect transistors of the first channel conductivity type coupled in series between the first voltage terminal and the sum node, and twelfth, thirteenth and fourteenth field effect transistors of the second channel conductivity type coupled in series between the second voltage terminal and the sum node, said low order carry node being coupled to gate electrodes of said first, fifth, ninth and twelfth field effect transistors, said first input node being coupled to gate electrodes of said second, sixth, tenth and thirteenth field effect transistors, said second input node being coupled to gate electrodes of said third, seventh, eleventh and fourteenth field effect transistors, said carry node being coupled to gate electrodes of said fourth and eight field effect transistors, and in which said carry producing circuit comprises a fifteenth field effect transistor of said first channel conductivity type coupled between the first voltage terminal and a third intermediate node, sixteenth and seventeenth field effect transistors of the first channel conductivity type coupled in parallel between the third intermediate node and said carry node, an eighteenth field effect transistor of said second channel conductivity type coupled between said second voltage terminal and a fourth intermediate node, nineteenth and twentieth field effect transistors of the second channel conductivity type coupled in parallel between the fourth intermediate node and the carry node, twenty-first and twenty-second field effect transistors of the first channel conductivity type coupled in series between the first voltage terminal and the carry node, and twenty-third and twenty-fourth field effect transistors of the second channel conductivity type coupled in series between the second voltage terminal and the carry node, said low order carry node, being coupled to gate electrodes [to] of said fifteenth and eighteenth field effect transistors, said first input node being coupled to gate electrodes of said sixteenth, nineteenth, twenty-first and twenty-third field effect transistors, said second input node being coupled to gate electrodes of said seventeenth, twentieth, twenty-second and twenty-fourth field effect transistors.

2. A full adder as set forth in claim 1, in which said first and second channel conductivity types are of an n-channel type and a p-channel type, respectively, and in which a positive voltage level and a ground voltage level are supplied to said first and second voltage terminals, respectively.

* * * * *

UNITED STATES PATENT AND TRADEMARK OFFICE
CERTIFICATE OF CORRECTION

PATENT NO.   :   4,999,804
DATED        :   March 12, 1991
INVENTOR(S)  :   Tomoji NUKIYAMA It is certified that error appears in the above-identified patent and that said Letters Patent is hereby corrected as shown below:

Col. 4, line 15, delete "n-channel" and insert --p-channel--

Col. 5, line 42, delete "inver&ers" and insert --inverters--

Col. 5, line 50, after "  "1" level " insert --.--

Col 5, line 51, delete "tits" and insert --bits--

Col. 6, line 65, delete "[to]".

Signed and Sealed this

Twenty-fifth Day of August, 1992

*Attest:*

DOUGLAS B. COMER

*Attesting Officer*        Acting Commissioner of Patents and Trademarks